APPARATUS FOR REPRODUCING IMAGES IN COLOR

Filed June 28, 1951

INVENTOR
Alfred C. Schroeder
BY
[signature]
ATTORNEY

APPARATUS FOR REPRODUCING IMAGES IN COLOR

Filed June 28, 1951 2 Sheets-Sheet 2

INVENTOR
Alfred C. Schroeder
BY
ATTORNEY

Patented July 27, 1954 2,684,995

UNITED STATES PATENT OFFICE 2,684,995

APPARATUS FOR REPRODUCING IMAGES IN COLOR

Alfred C. Schroeder, Southampton, Pa., assignor to Radio Corporation of America, a corporation of Delaware Application June 28, 1951, Serial No. 234,015

4 Claims. (Cl. 178—5.4)

This invention relates to apparatus for reproducing images in color in response to video signals representing each of a plurality of component colors and derived by a scanning process.

In the prior art each of the component color signals have been applied so as to control the intensity variations of a separate kinescope. It is also known that colored images can be reproduced by a single kinescope. Generally such a kinescope has phosphors distributed over the face of the tube adapted to reproduce each of the different component colors. Means are provided for exciting one of the phosphors into fluorescense having an intensity corresponding to the variations of the corresponding color signal. In some cases a separate electron beam excites each different color of phosphor, and in others it is done in sequence by a single beam.

The maximum brightness of most scenes exceeds the maximum brightness provided by a kinescope, and to this extent the images formed by a kinescope are not faithful reproductions.

Accordingly it is one object of the present invention to produce images in color with one or more kinescopes in such manner that the maximum brightness available is increased.

One of the rather stringent requirements of the type of apparatus described above is that the partial image of each component color must be in proper registry. Misregistration not only causes errors in the colors produced but also reduces the clarity of the detail.

It is therefore another object of this invention to provide improved apparatus for reproducing images in color with one or more kinescopes in which the requirement for registration is decreased.

Briefly, these objectives may be achieved by providing means for exciting a white or yellow phosphor in accordance with the lowest amplitude color signal in combination with means for exciting each of a plurality of different color responsive phosphors with a signal equal to the difference between the signal applied to excite the white or yellow phosphor and the signal representing the color produced by that particular phosphor.

Increased brightness results from the use of an additional phosphor. The eye is better adapted to perceive details presented by variation in brightness than it is in color. Hence where the brightness is produced by the combined excitation of a plurality of different color responsive phosphors, as was done in the prior art, the excitation of the different phosphors must be accomplished in precise registry. However, if as in the present invention, the brightness of an image is produced by the excitation of a single phosphor, no registration problem exists for brightness detail. The different color responsive phosphors may be excited in even poorer registry than before as the eye is not as sensitive to details in color.

The manner in which these objectives are attained will be better understood from a detailed consideration of the drawings in which.

Figures 1, 1A:
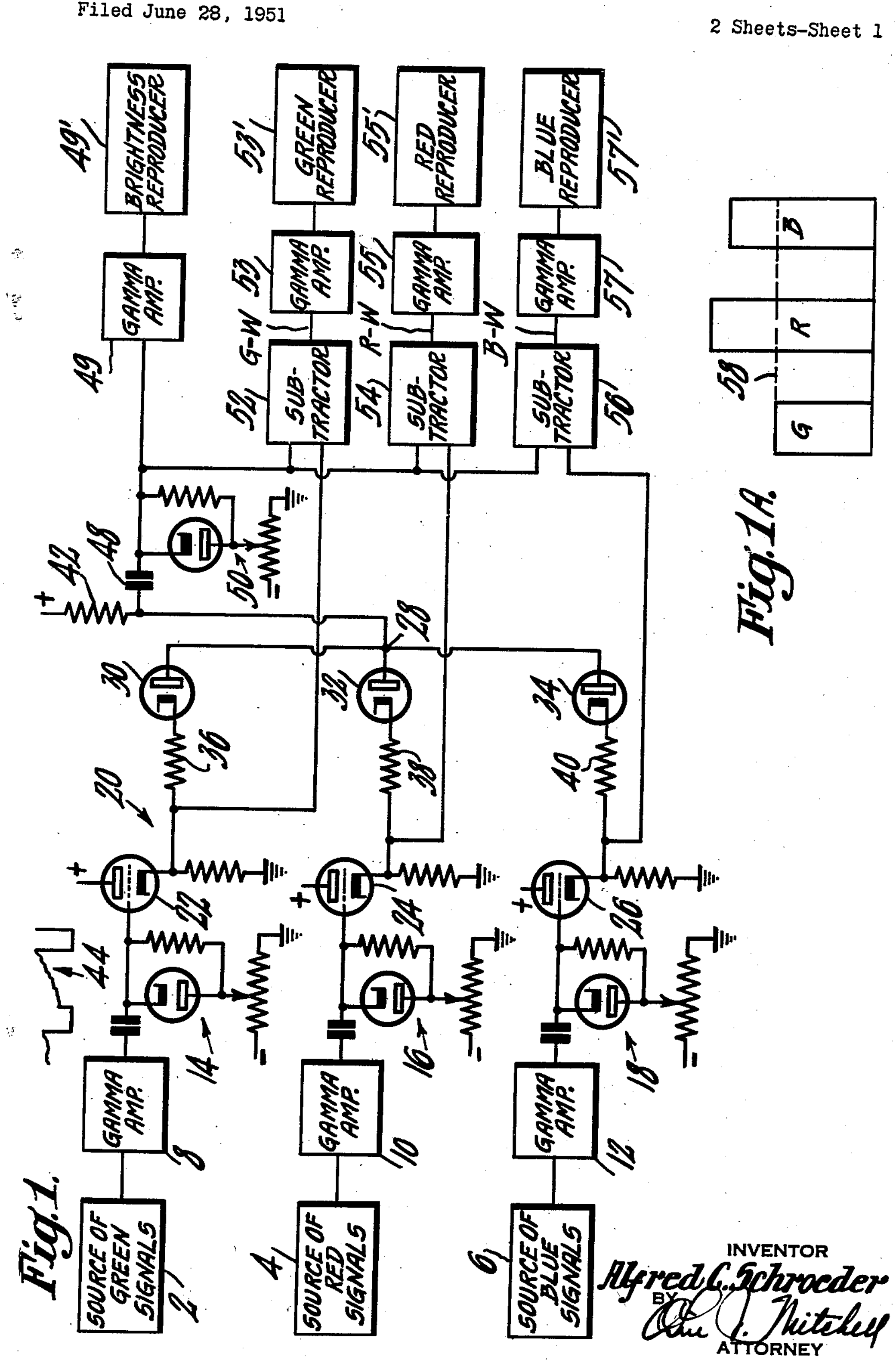
Fig. 1 illustrates one form this invention may assume.
Fig. 1A is a graph used in explaining the operation of the apparatus of Fig. 1.

Turning now to Fig. 1 we find that video signals representing the intensity variations of green as a scene is scanned are provided by a source 2, and the corresponding red and blue video signals are provided by the sources 4 and 6 respectively. Because the present invention involves subtracting one color signal from another, these signals should be linear. Color representative signals may for example be derived from a television receiver such as shown and described in a paper entitled "A Simplified Receiver for the RCA Color Television System" published in February 1950 by the Radio Corporation of America. Generally, the color signals available in television systems and the like are not linear and accordingly, the green, red, and blue video signals are passed through gamma amplifiers 8, 10, and 12 respectively.

If the video signals appearing at the output of the gamma amplifiers 8, 10, and 12 do not have proper DC levels, level setters such as 14, 16, and 18 may be inserted in the output of the gamma amplifiers 8, 10, and 12.

The output signals of the level setters 14, 16, and 18 are applied to a means 20 for selecting the color signal of the lowest amplitude. In the particular form of selecting means shown, the green video signals are applied to a cathode follower 22, the red video signals to a cathode follower 24, and the blue video signals to a cathode follower 26. The cathodes of the cathode followers 22, 24, and 26 are coupled to a common junction 28, by similarly polarized diodes 30, 32, and 34 respectively. Resistors 36, 38, and 40 are respectively connected in series with the diodes 30, 32, and 34. The junction 28 is connected to a source of fixed potential via a resistor 42 of relatively high ohmic value. The polarity of the diodes depends on the polarity of the signals supplied by the cathode follower to the diode. If the signals appearing at the cathodes of the cathode followers 22, 24, and 26 are of a polarity such that the signal increases in proportion to the brightness, the cathodes of the diodes are connected to the cathodes of the corresponding cathode followers.

The means 20 for selecting the color signal having the lowest amplitude operates as follows. With no color signals present, the diodes all conduct the same amount. This is the condition that prevails during blanking when all the signals go to zero or black level as indicated by the graph 44. As the intensity of a color signal increases, the potential applied to the cathode of the corresponding diodes becomes more positive. The diode to which the lowest color signal is applied conducts the most and the potential of all the diode plates drops to a value just above that of the lowest color signal. This latter value is less than the other color signals and therefore the other color signals cannot pass to the junction 28. If all the color signals are equal, as in a white portion of an image, all the diodes conduct equally. If only a single color signal is present, it cannot get through to the junction 28 because the other signals have zero value.

The signals appearing at the junction 28 are coupled to a means 49' for reproducing the brightness via a condenser 48 and a gamma amplifier 49. The gamma amplifier 49 alters the linearity of the signal in any desired manner. Generally it has an inverse curvature relation to the gamma amplifiers 8, 10, and 12 but not necessarily. The reproducing means may take the form of a plurality of kinescopes whose images are optically superimposed or it may be a single color tube. The phosphors employed in reproducing brightness may either be white or yellow.

After being clamped by any suitable level setting circuit such as indicated by the numeral 50, the lowest color signal appearing at the right hand side of the coupling condenser 48 is applied to each of a plurality of subtractors 52, 54, and 56. Subtractors are well known in the art and therefore the details need not be illustrated. The clamped green video signal appearing at the output of the cathode follower 22 is connected to the subtractor 52 so that the output signal of the subtractor 52 is equal to the difference between the green signal and the lowest color signal. The red and blue video signals are applied to the subtractors 54 and 56 so as to derive the difference between the red and blue color signals and the lowest color signal. The output of the subtractors 52, 54, and 56 are applied via the gamma amplifiers 53, 55, and 57 to means 53', 55' and 57' for reproducing green, red and blue portions of the image respectively. The gamma amplifier 53, 55, and 57 are similar to the gamma amplifier 49.

The overall operation of the apparatus of Fig. 1 is as follows: Assume that the green, red, and blue video signals simultaneously have the relative amplitude illustrated in Figure 1A. Because the green signal has the lowest amplitude, it is selected by the selecting means 20 and applied to a means for reproducing brightness. If the brightness reproducer has a white phosphor, equal amounts of all three colors are produced, this being the requirement if white is to be produced. The result is the same, as far as brightness is concerned, as if each of the different color reproducers were turned on by an amount indicated by the dotted line 58. The green signal is also applied to each of the subtractors 52, 54, and 56. In the subtractor 52 it is subtracted from itself and hence the output of the subtractor 52 is zero. This is proper inasmuch as all the required green light is supplied by the white tube. In the subtractor 54, the green signal is subtracted from the red signal thus yielding a signal equal in amplitude to the portion of the red signal above the dotted line 58 of Fig. 1A. The rest of the red signal comes from the white reproducer. In a similiar way the blue reproducer is supplied with the blue signal above the dotted line 58. Thus all the colors are reproduced with their proper relative intensities.

The portion of the color signals reproduced by the brightness reproducer are in registry as they may be scanned by a single beam of electrons. Therefore, any detail represented by the brightness is not deteriorated.

Figure 2:
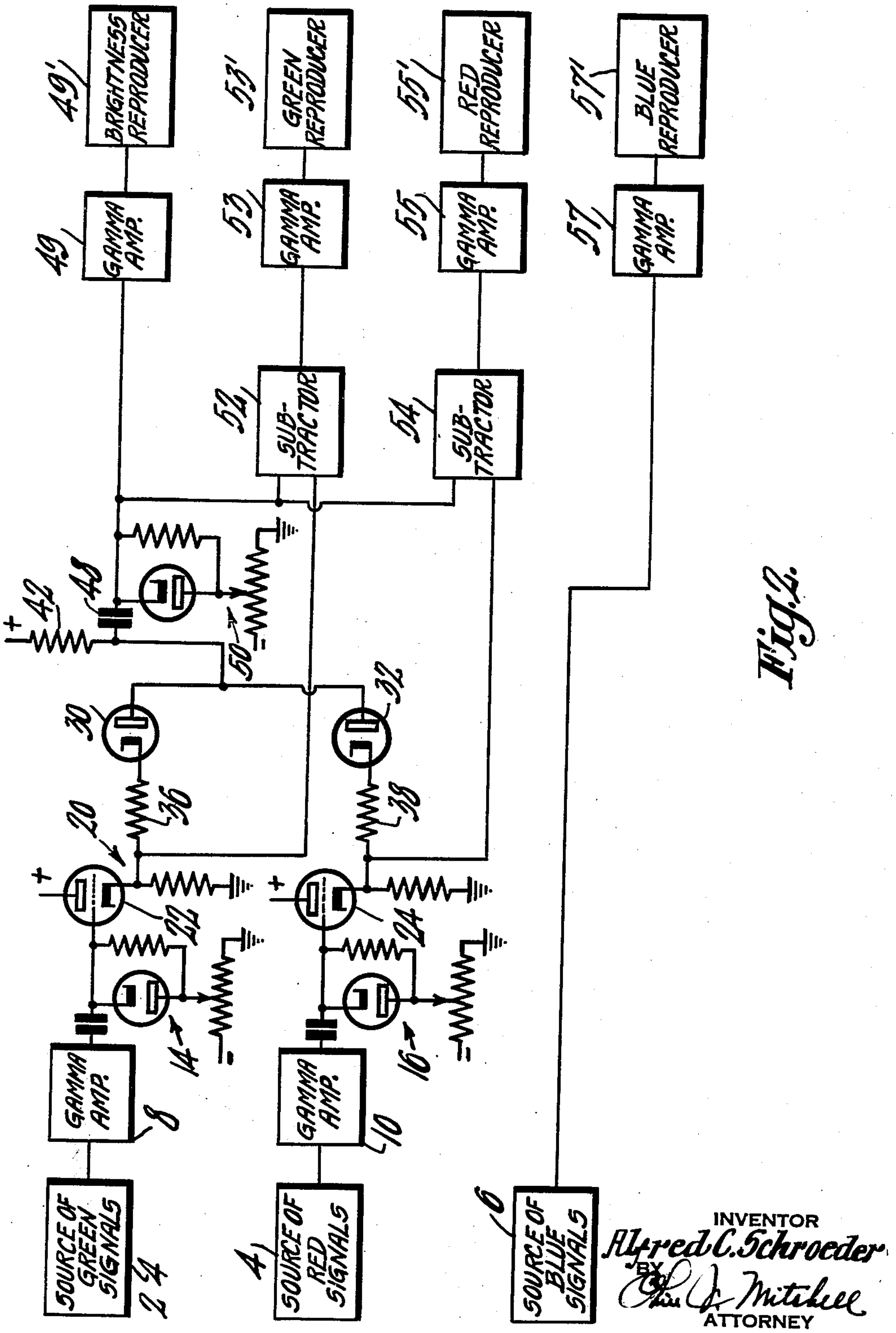
Fig. 2 illustrates the application of this invention to two color channels of a three color system.

In Figure 2, the brightness reproducer 49' emits yellow light. Corresponding parts of Figures 1 and 2 are indicated by the same numerals. The smaller of the red and green signals may be selected by apparatus as described in connection with Fig. 1. The signal thus selected is applied so as to control the intensity of the yellow light emitted by the brightness reproducer. This selected color signal is subtracted from the green signal in subtractor 52 and coupled to a green reproducer 53' via a gamma amplifier 53. Similarly, the selected color signal is subtracted from the red signal and the difference is applied to a red reproducer 55' via a gamma amplifier 55. In this particular arrangement the blue signals are applied to the blue reproducer 57' via a gamma amplifier 57 without having the selected signal subtracted from them. All the blue light is supplied by the blue reproducer 57' as no blue light is supplied by the brightness reproducer 49'.

If the brightness reproducer emits yellow light, the blue signals are bypassed around the selecting means 20 and coupled directly to the blue reproducer. In this arrangement, the blue signals do not control the amplitude of the signals applied to the brightness reproducer. As is well known, yellow light is comprised of red and green. Thus the smaller of the red and green signals is supplied to the brightness reproducer, and the difference between the two signals is applied to a reproducer adapted to produce light corresponding to the larger signal.

What is claimed is:

1. Apparatus for reproducing images in color comprising in combination a brightness image reproducer, and a plurality of color image reproducers, a plurality of sources of signals, each representing a different color, amplitude responsive means for applying the smallest of said color signals to said brightness reproducer, means responsive to relative signal amplitudes for separately subtracting the smallest of said color signals from each of the color signals, and means coupling each of the outputs of said subtracting means to a corresponding color reproducer.

2. Apparatus for reproducing images in color comprising in combination a plurality of input terminals each being adapted to receive signals representative of a different color, a plurality of signal output terminals, amplitude responsive means for selecting a color signal appearing at one of said input terminals and having an amplitude that is smaller than at least one other color signal, one of said output terminals being coupled so as to receive said selected color signal, means responsive to relative signal amplitudes for subtracting said selected signal from predetermined ones of said color signals, and each of the remaining output terminals being coupled so as to receive each of the color difference signals derived from said subtracting means.

3. Apparatus for reproducing images in color comprising in combination means for selecting the smaller of two color signals, a first subtractor adapted to subtract the selected color signal from one of said two color signals, a second subtractor adapted to subtract the selected signal from the other of said color signals, a brightness reproducer adapted to emit light corresponding to each of said two color signals, said brightness reproducer being coupled so as to receive the selected signal, a color reproducer adapted to emit light of one of said colors coupled to the output of said first subtractor, a second color reproducer adapted to emit light of the other of said colors coupled to the output of said second subtractor, and a third color reproducer adapted to emit light of a third color adapted to respond to signals representing a third color.

4. Apparatus for reproducing images in color in response to a plurality of color signals comprising in combination amplitude discriminating means coupled to respective sources of said signals for selecting the smallest color signal, a reproducer of brightness images coupled so as to have its intensity controlled by the smallest color signal, a plurality of subtractors, each of said subtractors being coupled to said selecting means and to each of said signal sources so as to subtract the smallest color signal from each of the color signals, and a reproducer of a different color coupled to the output of each one of said subtractors.

References Cited in the file of this patent

UNITED STATES PATENTS

| Number | Name | Date |
|---|---|---|
| 2,543,772 | Goldmark | Mar. 6, 1951 |
| 2,560,567 | Gunderson | July 17, 1951 |
| 2,566,693 | Cherry | Sept. 4, 1951 |
| 2,567,040 | Sziklai | Sept. 4, 1951 |